(No Model.)
J. T. PEDERSEN.
TOOL HOLDER AND TOOLS FOR THE SAME.
No. 386,263. Patented July 17, 1888.
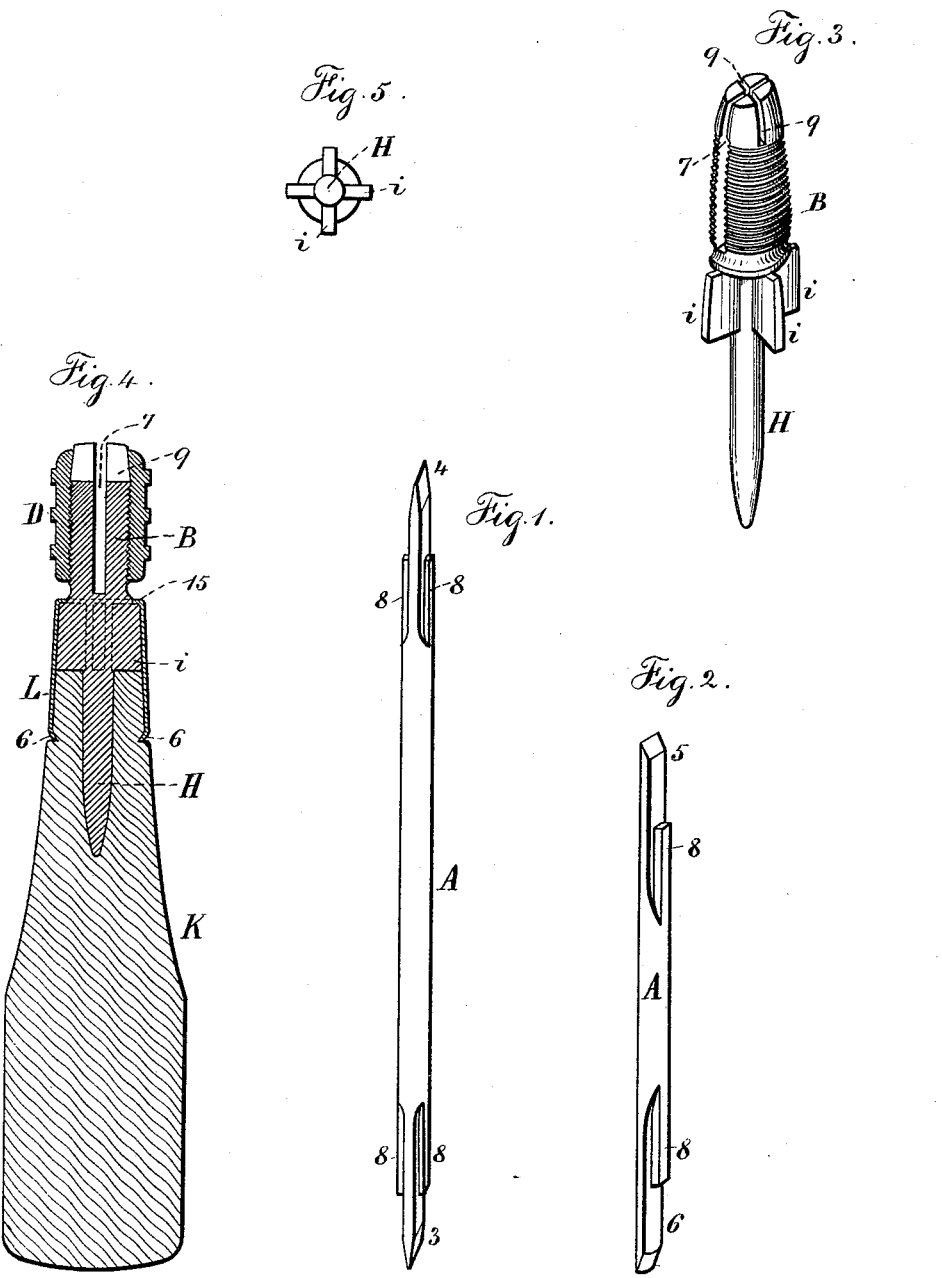

UNITED STATES PATENT OFFICE.

JOHANNES TH. PEDERSEN, OF BROOKLYN, NEW YORK.

TOOL-HOLDER AND TOOLS FOR THE SAME.

SPECIFICATION forming part of Letters Patent No. 386,263, dated July 17, 1888.

Application filed January 16, 1888. Serial No. 260,818. (No model.)

*To all whom it may concern:*

Be it known that I, JOHANNES TH. PEDERSEN, of the city of Brooklyn, in the county of Kings and State of New York, have invented an Improvement in Tool-Holders and Tools for the Same, of which the following is a specification.

Tool-holders have been made in which a screw-sleeve surrounds a clamping-chuck, the exterior surface of which is a screw-thread, and there is a longitudinal incision, so that the conical end of the sleeve may force the jaws of the chuck upon the shank of the tool for holding the same, and in some instances the chuck has been slotted in both directions, the slots crossing each other. In tool-holders of this character the shank of the tool usually stops against the bottom of the slot or intersecting slots, and hence a tool having two ends cannot be made use of because the cutting-edge becomes dull by contact with the metal at the end of the slot or slots.

By my present improvement I am able to make a tool with two cutting-edges and to reverse the same in the tool-holder without the risk of injuring the tool, and the tool-holder is adapted to the said tool, so that the tool is held in all directions within the tool-holder and cannot become loose by endwise hammering or by any lateral thrust, and I secure the tool-holder into the handle in such a manner that the same is not liable to become loose from shrinkage of the wood or from concussion while in use.

In the drawings, Figures 1 and 2 represent tools of different characters with my improvement. Fig. 3 is a perspective view of the chuck without the sleeve. Fig. 4 is a vertical section of the tool holder and handle, and Fig. 5 is a rear view of the shank and wings detached from the wooden handle.

The shank or body A of the tool is of any desired shape or size. I have shown the same as round, and in Fig. 1 as having at its ends screw-drivers 3 and 4, and in Fig. 2 as having chisels 5 and 6. The blade of the tool is of a thickness adapted to pass into the slot 7 of the tool-holding chuck B, and there are ribs 8 running partially along the flat portions of the blade, either at both sides of the same, as shown at Fig. 1, or at only one side of the same, as shown in Fig. 2, and these ribs 8 are of a size adapted to pass into the short slots 9 in the tool-holding stock B. The sleeve D is of ordinary construction and fitted to screw freely upon the screw-thread around the tool-holding stock B, and the outer ends of the jaws of the stock B are tapering, and the inner part of the end of the sleeve D is also tapering, so that when the sleeve D is screwed tightly upon the tool-holding stock B the blade portion of the tool that passes into the slot 7 will be tightly clamped by the jaws being sprung toward each other by the action of the inclines and the screw-sleeve. Thereby the tool will be held from dropping out, and the rib or ribs 8, passing into the slot 9, form a stop that prevents the tool sliding into the tool-holder after the end of the rib touches the bottom of the slot 9, so that any pressure or hammering action exerted upon the tool is taken by the end of the rib or ribs 8, and there is no risk of injury to the cutting end of the tool, and the tool cannot move laterally, because the rib 8, fitting the groove 9, maintains the tool in line with the tool-holder and its handle.

By slackening the screw-sleeve the tool can be taken out with facility and reversed or another tool substituted. Of course it is to be understood that where the screw-driver, chisel, or other tool is too wide to pass through the opening at the end of the screw-sleeve D the tool cannot be reversed, and the portion passing into the tool-holding stock is only the shank of the tool, but it is to be made in either of the forms represented for the ends of the tools in Figs. 1 and 2.

The stock B of the tool-holding chuck is made with a shank, H, adapted to pass into a hole bored into the end of the handle K, which handle is preferably of hard wood, and there are wings *i* at the base of the stock B which pass into slots or mortises cut across the end of the handle K. These parts are made to fit tightly as the shank is driven into the wood, and as an additional security for holding the handle and chuck-stock together I make use of a ferrule, L, which is provided with a narrow inward flange, 15, that laps over the outer edges of the wings I, and this ferrule is slightly tapering, so as to be driven tightly over the slightly-tapering end of the wooden handle K, and the ferrule is firmly secured to the wood by the edge 6, being indented and pressed into the wood by a knurling-tool, which not only forces the flange of the metal into the wood, but also corrugates the same, so that it will not become loose or revolve around the end of the wooden handle.

By the construction before described of the respective parts the handle and tool are very rigidly united, and one tool can be easily substituted for another, and the tool-holder can be used in any of the ordinary ways. It may be revolved with a screw-driver or held firmly in any desired position with a turning-tool or driven endwise with a chisel or gouge.

I claim as my invention—

1. The improved tool-holder and tool composed of a chuck-stock having an exterior screw-thread and a long mortise or incision, 7, through said stock to form spring-jaws, and short intermediate mortises or incisions, 9, through said stock, and a screw-sleeve surrounding such stock and tapering near the end to close the spring-jaws, in combination with a reversible tool having two end portions or blades flattened and of a thickness adapted to pass into the long mortise 7 of the stock, and having one or more ribs, 8, upon the flattened end portions adapted to pass into the incisions 9 of the stock, substantially as set forth.

2. The combination, with a stock, B, having a long mortise, 7, and a short mortise, 9, of a tool having flattened ends or blade portions of a thickness adapted to pass into the long mortise 7 of the stock, and the ribs on one side of the flattened blade portions and adapted to pass into the incision 9, substantially as set forth.

3. The combination, with a stock, B, having a long mortise, 7, and a short mortise, 9, of a tool having flattened ends or blade portions of a thickness adapted to pass into the long mortise 7 of the stock, and the ribs on one side of the flattened blade portions and adapted to pass into the incision 9, the length of the flattened end portions of the tool being less than the depth of the mortise 7, so that the pointed ends of the tool do not come into contact with the bottom of the mortise, substantially as set forth.

4. The combination, with the screw-sleeve and the handle slotted crosswise at one end, of the tool-holding chuck B, having a short solid tang, H, and the four projecting wings I, passing into the slots in the handle K, substantially as set forth.

Signed by me this 12th day of January, A. D. 1888.

J. TH. PEDERSEN.

Witnesses:
 GEO. T. PINCKNEY,
 WILLIAM G. MOTT.